March 15, 1960 J. C. SIMS, JR., ET AL 2,928,596

CARD READING SYSTEMS

Filed Dec. 19, 1955 3 Sheets-Sheet 1

INVENTORS
JOHN C. SIMS, JR.
H. FRAZER WELSH
BY Charles C. English
AGENT

INVENTORS
JOHN C. SIMS, JR.
H. FRAZER WELSH
BY
Charles E. English
AGENT

March 15, 1960 J. C. SIMS, JR., ET AL 2,928,596

CARD READING SYSTEMS

Filed Dec. 19, 1955 3 Sheets-Sheet 3

INVENTORS
JOHN C. SIMS, JR.
BY H. FRAZER WELSH

Charles C. Engfield
AGENT

United States Patent Office 2,928,596

Patented Mar. 15, 1960

2,928,596

CARD READING SYSTEMS

John C. Sims, Jr., Spring House, and Herbert Frazer Welsh, Philadelphia, Pa., assignors to Sperry Rand Corporation, New York, N.Y., a corporation of Delaware Application December 19, 1955, Serial No. 554,604

21 Claims. (Cl. 235—61.11)

This invention relates to systems for reading cards and more particularly to an electronic system for reading punched record cards. In the prior art, punched cards and means for automatically reading the same are well known but the prior systems have certain inherent disadvantages which are overcome by the present invention which proceeds on an entirely new principle that enables considerably higher operating speeds than have heretofore been possible. The prior systems have drawbacks in that they do not operate at sufficient speed, and moreover, when efforts are made in the prior art to secure high speed operation, the reliability of the system is greatly decreased. It is a primary object of this invention to provide a card reading system that has high speed along with a high degree of reliability. Other objects of the invention include producing an output signal from the reading operation which may be readily recorded, or in the alternative, readily fed to an electronic computing system.

Other objects of the invention will appear as this description proceeds.

The preferred form of the invention may be briefly described as follows. A cathode ray tube has the usual electron beam arranged to scan in a way roughly similar to the beam of a television tube. As the leading edge of the card approaches the cathode ray tube, it is parallel to the higher speed direction of deflection (comparable to the horizontal scan of a conventional television tube). Whenever the vertical, or slow, scan intercepts the leading edge of the card, a signal is produced which is indicative of the position of the leading edge of the card. In other words, if the card has moved in the direction of vertical scan for only a short distance, the vertical scan will intercept the edge of the card more quickly than if the card has advanced a considerable distance along the face of the tube in the direction of the vertical scan. This enables the position of the leading edge of the card to be determined. As the card advances to different predetermined positions across the face of the tube, the beam is shifted to read any indicia on the card. By providing signals in the output indicative of the position of the leading edge of the card at the time the beam searches for indicia, it is possible to indicate whether or not indicia appears at predetermined places on the card. The invention involves rather extensive details for carrying out the same, all of which are hereinafter fully described. Furthermore, features of the invention other than those just mentioned above will become apparent as the description proceeds.

Figure 1:
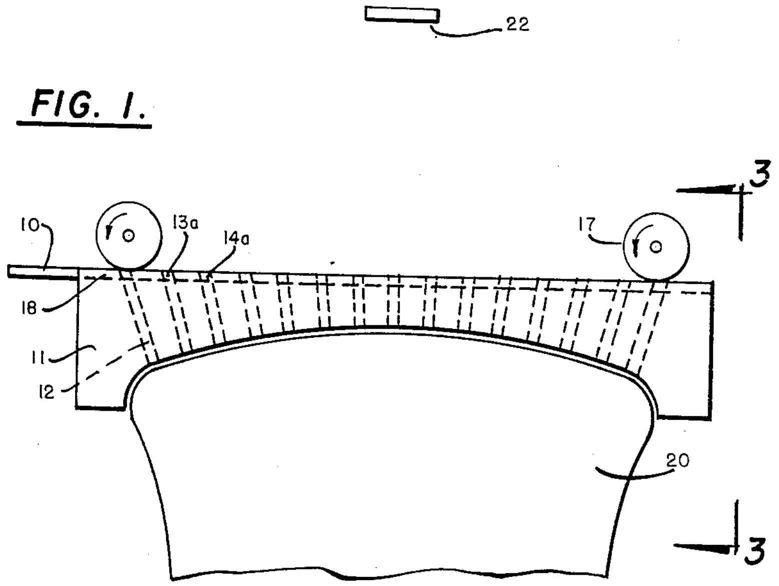
Figure 1 is a side view of a portion of a cathode ray tube with a mask thereon, forming a part of the system hereinafter described.
Figure 2:
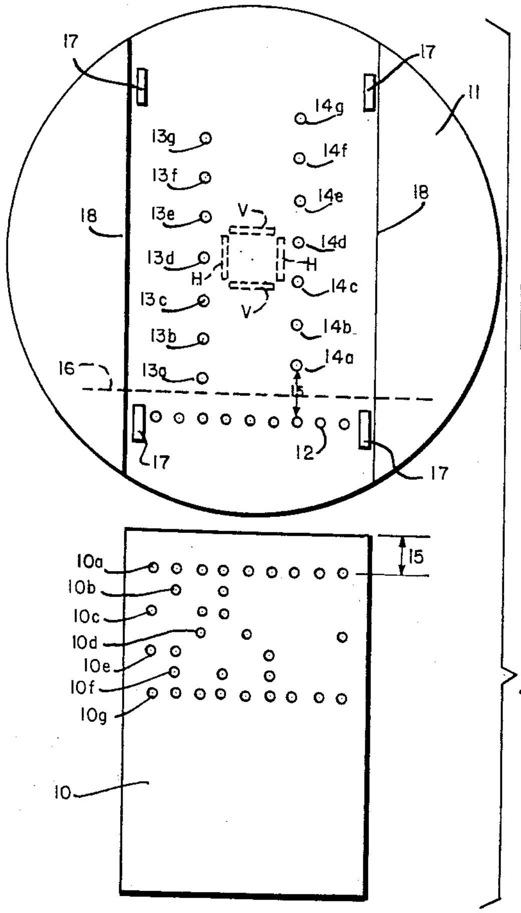
Figure 2 is a top view of the mask of Figure 1 together with a card 10 which is about to be fed onto the mask.
Figure 3:
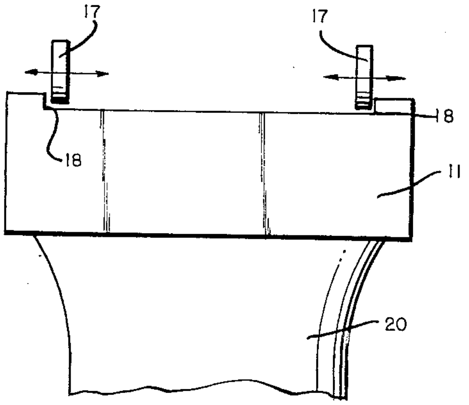
Figure 3 is a view along the lines 3—3 of Figure 1.

As shown in Figures 1, 2 and 3, the cathode ray tube 20 has a mask 11 carrying a slot 18 equal to the width of the card 10 to be fed therethrough. Suitable wheels 17 which rotate at constant speed tend to drive the card, at constant speed, through the slot 18 in the mask 11. The card 10 is illustrative of any suitable device carrying indicia at predetermined points thereon but for purposes of illustration this card is shown as having holes punched in rows 10*a* to 10*g* inclusive. While for purposes of illustration a hole is shown in each row, it would be possible to have an entire row in which no holes appear. The number and position of holes in the rows determine the information stored on the cards. As shown, there is a maximum of nine holes in a row although any other maximum number could be employed. The mask 11 has a first row of nine holes 12 which will be in alignment with the nine holes shown in row 10*a* when the latter reaches a position immediately above the row 12. Likewise, the holes in rows 10*b* to 10*g* inclusive will coincide with the position of holes in row 12 as the several rows 10*b* to 10*g* inclusive pass across the holes of row 12. There are two columns of holes 13*a* to 13*g* inclusive and 14*a* to 14*g* inclusive formed in the mask 11 which are staggered with respect to each other for purposes which will hereinafter appear. The cathode ray tube has horizontal deflection plates H for controlling the beam in a horizontal direction and vertical deflection plates V for controlling the beam vertically. At the beginning of each frame, the beam is scanning at a rapid rate along the starting line 16 by virtue of a sawtooth wave being applied to the horizontal deflection plates H. The potential on the vertical deflection plates V will rise at a slow rate as compared with the frequency of the horizontal scanning (deflecting the beam upwardly as viewed in Figure 2) but at a very rapid rate as compared with the forward speed of the card 10. The beam will scan in a vertical direction a distance depending on the position of the card. If the card is not above the mask at all, the beam will scan upward until it strikes hole 13*a* at which time the light will pass through that hole to the photocell 22 and this will cause the potential of the vertical deflection plates to drop back to the beginning of the frame and scanning will proceed from line 16 upward to hole 13*a* again, whereupon the light will impinge on photocell 22 and the scanning will again be reverted to the original scanning line 16 and will again gradually move upward until it strikes hole 13*a* at which time it will return to line 16 and repeat the operation. If, however, the card 10 is moved forward until it covers hole 13*a* but has not yet advanced far enough to cover hole 14*a*, the operation will be somewhat different. It is understood that while the holes 13*a* and 14*a* are here shown as having a substantial vertical displacement from each other, actually there is in practice only a very slight vertical displacement between the uppermost part of hole 13*a* and the lowermost part of hole 14*a*. When the card has advanced so that its edge is tangent to the upper part of hole 13*a* as well as the lower part of hole 14*a*, the hole 13*a* is completely covered and therefore as the beam scans vertically, it no longer passes through hole 13*a* but continues its vertical scanning until it reaches holes 14*a*. The light passes through this hole to photocell 22 and this indicates that row 10*a* of holes in card 10 is aligned with the row of holes 12 in mask 11. The passage of light through hole 14*a*, falling on photocell 22, causes the beam to drop back to row 12 and to scan it once in a horizontal direction. The light passing through the holes 12 is controlled by the holes in row 10*a* and any light that passes these latter holes and strikes the photocell is fed to the output of the device, that is, to the electronic computer, or stored on the magnetic tape. After the row of holes 12 has been completely scanned, the beam is shut off for the time required for the card to advance until it has completely covered hole 14*a* and then the beam scans vertically along a horizontal line, parallel to line 16, which moves upward until the beam intersects hole 13*b*. Whenever light passes through any of the holes 13*a* to 13*g* inclusive and falls on the photocell 22, it always causes the scanning to start over again beginning with horizontal line 16. Hence in response to the beam passing through hole 13*b*, it being noted that the card has not yet covered this hole, the scanning is started over again. The beam will scan several frames in the time required for the card to pass from the lower edge to the upper edge of hole 13*b* and therefore the beam will be reverted a plurality of times before the hole 13*b* is completely covered by the card. When it is completely covered by the card, the card will have advanced so far forward that the next row of holes 10*b* in the card 10 will be aligned with complementary holes in row 12. The next time the beam scans vertically starting from the horizontal line 16, it will progress upwardly to hole 14*b*, and when light passes through any of the holes 14*a* to 14*g*, and strikes photocell 22, the apparatus will deflect the beam down to the horizontal line running through holes 12 and will scan those holes in sequence, feeding any signal resulting therefrom to the output for recording on the magnetic tape or for supplying the electronic computer. In this case since only two holes are in row 10*b*, there will be only two output pulses for this row. Moreover, the timing of the appearance of pulses from photocell 22 depends on the position of the holes in the row 10*b* and consequently will inform the electronic computer of information representative of the holes 10*b*. In other words, while rows 10*c* and 10*d* each have three holes each, since these holes appear at different positions, the impulses in the outputs due to these two rows of holes will have different spacings and will therefore indicate different bits of information.

From the foregoing it is clear that the forward position of the card is determined by the scanning operations which occur in the holes 13*a* to 13*g*, and 14*a* to 14*g*. When a card has been advanced a predetermined distance, as indicated by the beams passing through the last-mentioned two groups of holes, the beam is caused to scan one row of the holes of the card and produce output information. It is noted that there are as many rows of holes in group 13*a* to 13*g* as there are vertical rows of holes in card 10, and similarly there are as many holes in the group 14*a* to 14*g* as there are vertical rows of holes in card 10.

The electronic circuit for effecting the deflection of the beam in the cathode ray tube 20 will now be described in detail, reference being made to Figure 4. Signals from the photocell 22 are amplified by amplifier 24 and fed to gates 72 and 52. The output of gate 72 feeds gates 30 and 32. The sawtooth wave generator 26 controls the horizontal deflection plates H in the way which is conventional in commercial television broadcast receivers. The vertical deflection is controlled by several different sources. At the beginning of each frame, the condenser 40 has not been charged and the beam is biased to the level of line 16 of Figure 2. Hence, for each cycle of the sawtooth wave generator 26 the beam will scan line 16 once. As the condenser 40 is charged from positive source 65 through resistor 42 and rectifier 44, the potential on the condenser 40 increases and the vertical level at which the horizontal scanning takes place is raised. As is implicit from the description previously given, the condenser 40 charges at a slow rate as compared to the frequency of sawtooth wave generator 26, but at a rapid rate as compared with the speed at which the card 10 intercepts new holes 13*a*, 14*a*, 13*b*, 14*b*, etc. in the path of its forward progress. The condenser 40 may be discharged by effectively short circuiting it through thyratron 38, and therefore upon energization of the control grid of this thyratron, the beam may be restored to the level 16 of Fig. 2. As is implicit from the previous description of Figure 2, a different operation takes place when the beam passes through one of the holes 13*a* to 13*g* than when it passes through one of the holes 14*a* to 14*g*. The arrangement to effect this end will now be explained. It is noted that whenever the beam strikes one of the holes 13*a* to 13*g*, it does so during the first half of any given horizontal sweep, whereas if it passes through a hole 14*a* to 14*g*, it does so during the second half of any given horizontal sweep. The multivibrator 28 is linked to and driven by signals from the sweep generator 26 (or alternatively the sweep generator 26 and the multivibrator 28 are driven from a common master oscillator) and emits two output signals of the same frequency as that of the sawtooth wave generator 26. Moreover, the two output signals 13 and 14, of the multivibrator 28, are 180° out of phase with each other so that they alternately open gates 30 and 32. In other words, gate 30 is open during the first half of each horizontal sweep and gate 32 is open during the second half of each horizontal sweep. These gates are of conventional construction (for example, simple diode gates) and therefore pass signals from the amplifier 24 to the flip-flop circuit 36 as follows. If the sweep generator 26 is traversing the first half of a horizontal crossing, the signal 13 from multivibrator 28 opens gate 30. If during that half of the sweep, the beam intercepts one of the holes 13*a* to 13*g*, the energy from the photocell 22 passing through amplifier 24 will pass through the gate 30 to the set input of flip-flop 36 and to the grid of thyratron 38. On the other hand, if the beam intercepts one of the holes 14*a* to 14*g*, it will do so during the second half of the horizontal sweep at which time gate 30 will be closed (due to a negative signal at 13), but gate 32 will be open (due to a positive signal at 14) and therefore any signal produced in the photocell 22 and amplified at 24 may pass through the gate 32 to the reset input of flip-flop 36. Flip-flop 36 should preferably be of the type described in U.S. Patent No. 2,628,825 to John Presper Eckert, Jr. et al., and entitled "Flip-Flop Circuit."

When the set input of flip-flop 36 is energized by gate 30, there will be no output signal from the flip-flop circuit. However, when the reset input of the flip-flop 36 is energized by the gate 32, a signal will appear at the output of the flip-flop circuit and will energize the reset input of flip-flop 73 which will thereupon produce an output that will energize the differentiator 48. This differentiator responds to the steep wave front of the leading edge of the signal fed thereto and energizes the flip-flop circuit 50 in response to that leading edge. Once the output of flip-flop 73 is established, the differentiator 48 no longer has an output. In other words, the differentiator 28 produces an output only in response to a rapid change which is characteristic of the leading edge of the signal fed thereto. Differentiator 48 may be of conventional design. It has a condenser 48*a*, a resistor 48*b* and a rectifier 48*c*. If the RC time constant is short then the circuit will pass only the high frequency component of the signal. The diode 48*c* will remove any negative half cycles of the signal.

The flip-flop circuit 50 is preferably of the type shown in the aforesaid Eckert et al. Patent No. 2,628,825 and has a set input energized by the differentiator 64 (which may be similar to differentiator 48), and has a reset input fed by the differentiator 48. The flyback signal of sawtooth generator 26 energizes the differentiator 64 but the other portions of the sawtooth wave generator do not have sufficiently rapid change of potential (nor any change in the proper direction) to energize differentiator 64, and consequently it produces a set input pulse for flip-flop circuit 50 only in response to each flyback signal of sawtooth wave generator 26. For purposes of discussion it will be assumed that the output of differentiator 64 provides the "set" input for flip-flop 50 and places it in its "first" stable state, and that the "reset" signal from differentiator 48 places flip-flop 50 in its "second" stable state. In this second stable state, the flip-flop has a negative potential on its output 66 which is just sufficient to lower the potential on the lowermost vertical deflection plate and thereby lower the vertical scanning position to the row of holes 12 of Figure 1. In said second stable state, flip-flop 50 has no output on wire 67. The output of differentiator 64 also passes through delay line 74 and sets flip-flop 73. The delay line 74 is short, yet it insures that flip-flop 73 is not set until after flip-flop 50 is set. When the flip-flop 50 is reverted from its second stable state to its first stable state by the next flyback signal of sawtooth generator 26, potential will build up on wire 67, and differentiator 54 (which is similar in construction to differentiator 48) will respond to the steep wave front of the leading edge of this signal (but not the steady state thereof), and thus energize delay flop 55. The latter, when energized, effectively grounds the grid of the cathode ray tube 20 for a period of time about equal to that which a card requires to pass from the tangent intersecting the lower edge of hole 14a to the tangent intersecting the upper edge of hole 14a.

*Operation*

Referring first to Figures 1 to 3 inclusive, when there is no card above the mask 11, the beam undertakes a horizontal scan along line 16 by virtue of the high frequency sawtoothed signals from the generator 26 being impressed on the horizontal deflection plates H. The condenser 40 charges at a rate which is slow compared to that of the sawtooth generator, and causes the scanning to proceed vertically until the beam strikes hole 13a and energizes the photocell 22. The output of the photocell 22 is amplified at 24 and finds gate 30 open at this interval (since multivibrator 28 holds gate 30 open during the first half of each horizontal scan) and thus passes a signal to the grid of thyratron 38 which fires the thyratron and short circuits condenser 40 causing its potential to drop to zero. This causes the beam to return to its original horizontal scanning line 16. The condenser 40 then begins to be recharged from source 65 and the scanning again proceeds upwardly until the beam strikes hole 13a and passes to photocell 22 and thence through gate 30 to again fire the thyratron 38 and short condenser 40. After the potential of the condenser reaches zero the thyratron is extinguished and the beam again returns to the horizontal level 16. This sequence of operations continues until the leading edge of the card 10 covers the entire hole 13a. The next frame of scanning proceeds from line 16 with the condenser 40 charging slowly until the beam moves upward to such a level that light passes through hole 14a. This occurs during a second half of a horizontal scan and therefore gate 30 is closed but gate 32 is open, whereby the signal appearing at the output of photocell 22 is amplified at 24 and passes through gate 32 to the reset input of flip-flop 36 which energizes flip-flop 73 causing a sharp rise in the output potential of the latter which energizes differentiator 48 that in turn energizes the reset input of flip-flop 50, which in turn produces a negative output on wire 66 that passes through rectifier 46 to the vertical deflection plates V. This potential is of such predetermined negative value as to drop the beam to the level of the row of holes 12, and consequently the next horizontal scan will take place beginning at the left end of the row 12 and proceed progressively to the right end of that row. At this instant the card 10 has advanced until the holes of row 10a are in alignment with complementary holes 12. In other words, the distance

15 on the mask 11 is equal to the distance 15 on the card 10. Since there is the same number and relative positioning of holes in row 10a as there is in row 12, a light ray will pass through each one of the holes 10a as the beam makes its horizontal sweep of the row 12. Hence there may be nine successive light impulses striking photocell 22 which will be amplified at 24 and fed through gate 52 (which is now open due to the signal placed on wire 66 by the flip-flop 50). Hence the nine impulses due to the holes 10a will pass through gate 52 to the output circuit 70. As soon as the beam has made one complete horizontal sweep of the row 12, the flyback signal of generator 26 will energize differentiator 64 which in turn will energize the set input of flip-flop 50 terminating the signal on output wire 66 and establishing an output signal, that has a steep wave front, on the output 67. This steep wave front passes differentiator 54 which in turn energizes the delay flop 55 and grounds the grid of the cathode ray tube 20. It also diverts current from source 65 to ground through diode 78 and the delay flop 55 and thus suspends any further charging of the condenser 40 temporarily.

Figure 4:
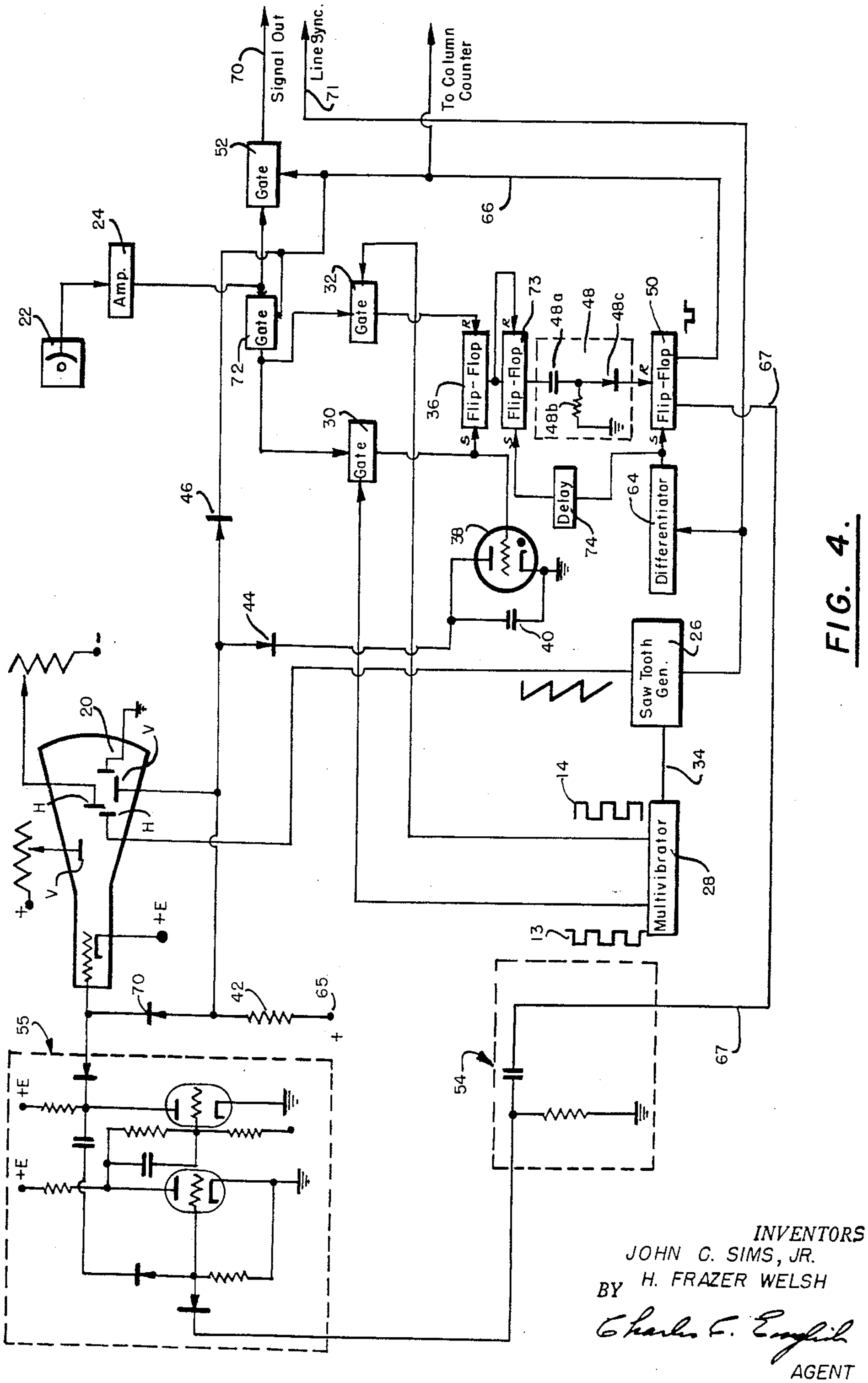
Figure 4 is a block diagram of the electronic circuit employed in the invention.

Delay flop 55, also known as a "one-shot," or monostable, multivibrator, is of conventional construction and a suitable well known one is shown schematically in Figure 4.

As stated above, the delay flop 55 grounds the grid for a time equal to that required for the card 10 to advance a distance equal to the diameter of hole 14a. The apparatus is rendered inoperative during this period, since there is no beam in the cathode ray tube and there is no further charging of the condenser 40. As soon as the delay period of delay flop 55 has terminated, the card has now completely covered hole 14a but has not as yet completely covered hole 13b. At the termination of the period of the delay flop 55 the condenser 40 continues to be charged by source 65 through rectifier 44. It is noted that the condenser 40 was not discharged by virtue of the light beam passing through hole 14a. In other words, the condenser 40 is only discharged to zero when the light beam passes through one of holes 13a to 13g inclusive. Therefore the condenser 40 is charged further, starting with the degree of charge it had when the light beam first struck hole 14a, and this charging continues until the light passes through hole 13b. This occurs during the first half of one of the horizontal scanning cycles, whereby gate 30 is open and thyratron 38 is therefore fired, short circuiting the condenser 40. When the condenser 40 is completely discharged and the thyratron is no longer ignited, the beam is restored to horizontal line 16 from whence it begins to scan upward again, as the condenser 40 is again charged, until the beam again intercepts hole 13b at which time the thyratron 38 is again fired and the beam is restored to horizontal line 16. This cycle of events continues until the card completely covers hole 13b at which time the scanning proceeds in the regular way until the beam passes through hole 14b, at which time a sequence of events happens the same as in the case where the beam passed through hole 14a, except that horizontal row 10b is now above the row of holes 12 and since row 10b has only two holes in it there will be only two output signals fed through the gate 52 to the output 70 during the horizontal scanning of the row 12. The condenser 40 will remain charged while this second scanning of the row 10b is taking place and the delay flop 55 will shut off the beam until the card completely covers hole 14b at which time the beam will scan upward until it intercepts hole 13c whereupon the same sequence of operations will occur repeatedly the same as in the case of hole 13b.

Figure 5:
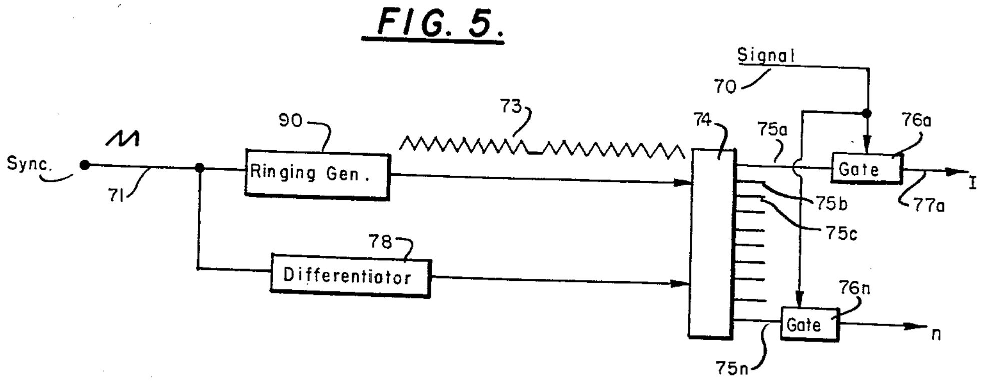
Figure 5 illustrates one output circuit of the device.
Figure 6:
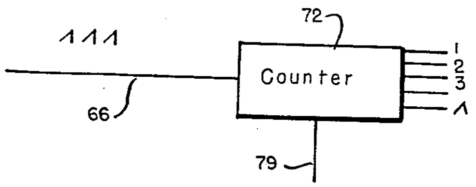
Figure 6 illustrates another output circuit of the device.

It is noted that the vertical distance between rows 10a and 10b, and 10b and 10c, and 10c and 10d, etc., are all equal and are equal to the distances between the holes in the column 14a to 14g inclusive, so that each time the leading edge of the card 10 completely covers a hole of the group 13a to 13g, a new row of holes (one of the rows 10a to 10g inclusive) coincides in position to the row 12 and hence is ready to be read. One way of utilizing the output signals that appear on the wire 70 is shown in Figure 5. The sawtoothed synchronized signal on wire 71 feeds a ringing generator 90 of the type well known in the radar art for supplying range markers. The ringing generator 90 produces a series of output pulses 73 which are harmonically related to the synchronizing signal 71. The signals 73 feed a counter 74 which is stepped forward once for each such signal, and therefore the outputs 75a, 75b, 75c . . . 75n are sequentially energized. In the case illustrated in Figure 2, where there are nine holes in row 12, there would be a total of nine output leads from the counter 74. In other words, n of Figure 5 would be 9. Hence there would be nine gates 76a to 76n inclusive which would be sequentially opened by the outputs 75a to 75n inclusive. The output signal 70 is fed to each of the gates 76a to 76n inclusive and would pass through whichever gate is open. Hence if the first hole in row 12 (in accordance with the assumptions heretofore made, this would be in the hole at the left of row 12) passes a beam of light which finds a hole in the card at that position, the photocell 22 will be energized and the signal will pass through amplifier 24, gate 52 to wire 70 and thence through gate 76a which will be open by reason of the fact that the first marker signal of the train 73 will energize the counter 74 and produce a signal on wire 75a which coincides in time with the appearance of the signal on wire 70 due to said first hole. If the light beam finds passage through the second hole of group 12 and through the second hole of a row on the card 10, it will energize the photocell 22 and pass through gate 52 to wire 70 and to a gate 76b (not illustrated) which is controlled by wire 75b. This latter gate would be opened by the second marker signal which occurs at the same time that the beam sweeps horizontally past the second hole of row 12. Likewise the beam passes the ninth hole of row 12 at the same time that the ninth marker signal 73 energizes the counter 74 to produce the ninth output therefrom on wire 75n. Hence if light passes through the ninth hole of the row 10a on the card 10, it will energize wire 70 at the same time that wire 75n is energized by the counter, whereby the gate 76n will pass that signal to the output wire n of Figure 5. The flyback signal of sweep generator 26 will energize differentiator 78 (constructed the same as differentiator 64) and jam the counter 74 to clear so it is ready to restart its operation.

It is also desirable to advise the computer or tape recorder as to which of the seven columns 10a to 10g inclusive is being read at any given time. This is accomplished by employing a column counter 72 fed by wire 66 so that each time the gate 52 is opened to allow a new train of pulses to be fed to wire 70, the column counter 72 is advanced forward once and produces an output signal on the next one of its output wires. There would be as many output wires from counter 72 as there are horizontal rows on card 10, in this case seven. Provision is preferably made for supplying a pulse on wire 79 that jams counter 72 clear each time a new card approaches the mask 11 of Figure 2. This could be done by any well known means and not being a part of our claimed invention, is not illustrated in detail.

Figure 7:
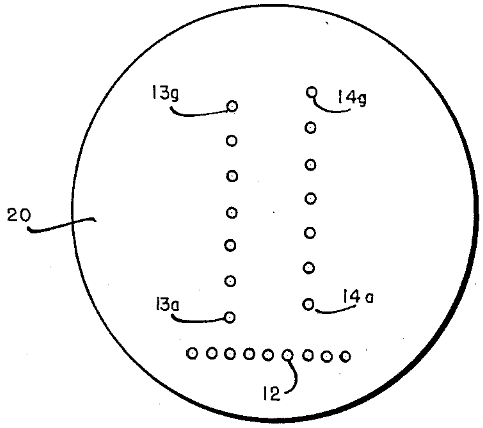
Figure 7 shows a modified form of cathode ray tube face.

It is unnecessary to employ the mask 11 if the cathode ray tube has spots of fluorescent material thereon according to the desired pattern. Figure 7 shows the tube face in this case. The cathode ray tube has no fluorescent material on its face except at spots forming row 12 and spots 13a to 13g inclusive, and 14a to 14g inclusive. Hence, light beams are produced by the tube only at these spots.

What is claimed is:

1. In a system for reading information from a moving element having indicia thereon, means for producing a light beam at each of two predetermined positions, means responsive to interception of said beam at said one of said positions by said moving element reaching said one position for causing the beam to appear at the other position, means for scanning said beam at said other position across said element, and means responsive to the scanning of said beam across said element at said other position for giving an output signal corresponding to the indicia on said element adjacent said other position.

2. In a system for reading information from an element having indicia thereon, means for producing a light beam at one of two different positions, means for moving the element so it will intercept said beam at said one of said positions, means responsive to the interception of said beam by said element at said one of said positions for switching the position of said beam to the other of said positions whereby said beam is directed onto a restricted portion of said moving element adjacent said other of said positions, and means responsive to said beam for detecting the presence of indicia on said restricted portion of said element at said other position.

3. In a system for reading information from a moving element having indicia thereon, means for alternately producing light beams at two predetermined positions, means for moving said element past one of said positions, means responsive to the interception of said beam by said moving element at said one position for immediately causing the beam to appear at the other position, and means which indicates whether the beam at said other position encounters an indicium on said moving element.

4. In a system for reading information from a moving element having indicia thereon, means for producing light beams at two distinct positions adjacent the path of movement of said element, means for detecting the presence of the beam at a first of said positions, said last-named means including means responsive to the extinguishing of said beam at said first position due to interception of said beam by said moving element at said first position for controlling the appearance of said beam at the second position, means for scanning said beam across said element at said second position, and output means responsive to the scanning of said beam at said second position for reading the indicia on said moving element adjacent said second position.

5. In a system for reading information from a moving record carrying information in the form of indicia thereon, a light source emitting a beam of light, means which determines when said record has moved to a first predetermined position comprising means for directing the beam from said source to said first predetermined position, said last-named means including detector means for determining whether the beam directed to said first predetermined position is intercepted by said record at said first position, and means responsive to a determination by said detector means that the said record has reached said first predetermined position for redirecting the beam to a second predetermined position, different from said first position, adjacent said moving record, and means responsive to said beam at said second position for producing an output signal if an indicium is encountered on said record by said redirected beam.

6. In a system for reading information from a moving element having indicia thereon, means for producing a light beam at a plurality of positions along the path of movement of said element, and means operative in response to the leading edge of the element intercepting the beam at any one of said positions for sensing a portion of said element to determine if, at a predetermined fixed position, there is an indicium which has been carried by the movement of said element to that fixed position.

7. In a system for reading information from a card where the information is determined by the presence or absence of an indicium a predetermined distance from one edge of the card, a cathode ray tube, means for first directing the beam in said tube to a first position on the face of said tube, means for moving said card across the face of said tube, means which responds to interception of said beam by said card at said first position for shifting the beam by said predetermined distance to a second position on the face of said tube, and means responsive to said beam adjacent said second position for detecting the presence of said indicium on said card adjacent said second position.

8. In a system for reading information from an element having indicia thereon, a cathode ray tube having beam producing means, said cathode ray tube having means cooperating therewith for producing a light beam from predetermined spots along the tube when they are bombarded, means for moving the element sequentially past said spots, means for sequentially directing the beam at said spots at a rate much faster than the speed of movement of said element, means for detecting when the leading part of said element intercepts the beam at any of said spots, and means operative to read information from the element each time the leading part of the element intercepts said beam at another one of said spots comprising means for detecting at a predetermined location the presence of any indicium on said element at said location.

9. In a system for reading information from a card where the information is determined by the presence or absence of indicia at a plurality of predetermined positions from one edge of the card, means including at least one light beam for producing a signal each time one edge of the card passes each point of a predetermined series of fixed points, a first output fed by said signals, means responsive to each said signal for producing a signal when the card has an indicium thereon that is at a predetermined fixed position, and a second output fed by the last-named signals.

10. In a system for reading information from a card where the information is determined by the presence or absence of indicia at each of a plurality of predetermined positions on the card, means for producing a light beam which is intercepted by said card when the card advances to a predetermined position, means responsive to the interception of said beam by said card for producing a beam that senses said plurality of positions, means for producing an output signal which changes each times each such position is sensed, and means for producing an output signal which is changed in response to each finding of an indicium at one of said plurality of positions.

11. In a system for reading information from a card where the information is recorded by the presence or absence of indicia at each of a plurality of positions on the card which positions are arranged in rows and columns, means which produces a signal each time the leading edge of the card passes each one of a plurality of points spaced apart the same as the rows of the card are spaced from each other, means which in response to each signal sequentially senses a new row of indicia and produces signals in accordance with the presence or absence of indicia in the different columns of the row, and output means including three outputs the first of which is fed by the signals produced by the first-named means, the second one of which is fed by the signals produced by the second-named means and the third one of which produces a signal to indicate each time the second-named means begins to sense a new column of each row.

12. In a system for reading information from an element having indicia thereon, a cathode ray tube having beam producing means, beam deflecting means, a mask on the cathode ray tube, means whereby the element may be moved relative said mask, said mask having a plurality of holes spaced apart along the path of motion of the element and another group of holes therein, pickup means responsive to any light rays that pass the mask and element, means to energize the beam deflecting means to direct light rays sequentially through said plurality of holes until said pickup means finds that light passed through the mask without being blocked by the element while the light that passed through the next adjacent hole in the element was so blocked and thereupon produces a signal, and means which in response to said signal energizes the beam deflecting means to effect scanning of said group of holes in sequence.

13. In a system for reading information from an element having indicia thereon, a cathode ray tube having beam producing means and means for producing spaced spots of light from spaced points along the path of said element when those points on the tube are bombarded by the beam, means for deflecting the beam to sequentially bombard said spots and for determining the effect of the element thereon until it is found that the light from one spot is interrupted by the element but light from the next spot is not interrupted by said element whereupon a signal is produced, means providing a row of spots which when bombarded will produce light, and means which in response to each said signal will so control the third-named means as to cause the beam to scan said row of spots.

14. A system as defined in claim 13 including means which in response to the completion of the scanning of the row of spots causes the third-named means to continue its sequential bombarding of the first-named spots and thus cause the third-named means to produce a new signal which will again actuate the fifth-named means.

15. In a system for reading information from a card having indicia thereon, a cathode ray tube with beam deflecting means thereon, means whereby there are two rows of spots on the face of the tube which when bombarded will produce light, said rows extending along the path of the card and the spots of the rows being staggered so that as the card advances the card will first cover the spot of the first row and second a spot of the second row and third the second spot of the first row and fourth the second spot of the second row and so forth, means whereby there is a group of spots on the face of the tube which produce light when bombarded and across which the card moves when it is advancing along said rows of holes, horizontal deflection means for causing the beam to traverse the face of the tube transverse to the lines of the rows of spots, vertical deflection means for moving the scanning line vertically at a rate slow as compared to the horizontal scanning rate but fast compared to the speed of the card, means whereby the vertical scanning is returned to its starting line each time the beam passes through a hole in the first row without being interrupted, means whereby the vertical scanning potential is modified so that the next horizontal sweep will bombard said group of spots, and means producing output signals in response to alteration of the light produced by the last-named group of spots by indicia on the card.

16. In a system as defined by claim 15 in which the second and third named means includes fluorescent material over the whole tube face and a mask for limiting the light emitted by the face to said spots.

17. In a system as defined by claim 15 in which the tube face has fluorescent material only at the positions of said spots.

18. In a system as defined by claim 15 having output means for producing two output signals one of which indicates each time the card advances to a new spot of the second row, and the other of which indicates each time the beam strikes a new spot of the said group.

19. In a system as defined by claim 15 having output means for producing an output signal each time the card advances to a new spot of the second row.

20. In a system for reading information from a record carrying said information in the form of indicia thereon, a cathode ray tube having beam producing means therein, means which detects absence of light emitted by the cathode ray tube due to interception of said emitted light by said record when the said record is moved past the tube, and means responsive to said last-named means for controlling the direction of the beam to effect scanning of said indicia on said record by said beam.

21. In a system for reading information from an indicia-bearing record, a cathode ray tube having beam producing means associated therewith, means for moving said record past the face of said cathode ray tube, means for detecting the position of said moving record adjacent the face of said tube, and means responsive to movement of said record to each of a preselected plurality of successive locations adjacent the face of said tube for successively causing said beam to scan a fixed line on the face of said tube thereby to sense in succession the presence of indicia on said moving record adjacent said fixed line.

References Cited in the file of this patent

UNITED STATES PATENTS

| | | |
|---|---|---|
| 2,401,021 | Rosenberg et al. | May 28, 1946 |
| 2,438,588 | Tolson | Mar. 30, 1948 |